United States Patent Office 3,179,653
Patented Apr. 20, 1965

3,179,653
METHOD OF PRODUCING A PHYTOTOXIN
Robert T. Sherwood, Raleigh, N.C., assignor to the United States of America as represented by the Secretary of Agriculture
No Drawing. Filed June 7, 1962, Ser. No. 200,892
6 Claims. (Cl. 260—210)
(Granted under Title 35, U.S. Code (1952), sec. 266)

A non-exclusive, irrevocable, royalty-free license in the invention herein described, throughout the world for all purposes of the United States Government, with the power to grant sublicenses for such purposes, is hereby granted to the Government of the United States of America.

This invention relates to phytotoxins. More particularly, it relates to a method of producing a phytotoxin from cultures of *Rhizoctonia solani* Kuehn having useful herbicidal properties.

It has already been observed for some time that soils infested with the fungus *R. solani* Kuehn have a pathogenic effect on a number of crops, e.g., soybeans, carrots, turnips, and peas. This pathogenicity is in part attributable to the action of pectinolytic and cellulolytic enzymes produced by the fungus. It has been further observed that autoclaved crude filtrates from cultures of *R. solani* also have deleterious effects on soybeans, carrots, and turnips, thus indicating that nonenzymic fungal products are also involved in the pathogenesis.

One object of this invention is to provide a method for obtaining a nonenzymic phytotoxin from cultures of *R. solani* Kuehn. Another object is to provide a method for concentrating and isolating a nonenzymic phytotoxin from cultures of *R. solani* having valuable herbicidal properties. Still another object is to characterize the said phytotoxin to provide information as to its chemical structure. Other objects will be apparent to those skilled in the art.

In general, the invention comprises growing the fungus, *R. solani* in a nutrient medium, extracting the culture with water or a polar solvent, precipitating the proteins, polysaccharides, and other contaminating large molecules from the aqueous or polar solvent extract, concentrating the extract, extracting the concentrated preparation with a nonpolar solvent, concentrating the nonpolar extract, and recovering the phytotoxin from the latter by chromatography.

In the above process, the polar solvent in the first extraction, in addition to water, can be methanol, ethanol, aqueous ethanol, acetone, or any other equivalent solvent. In the second extraction, the nonpolar solvent can be ether, chloroform, carbon tetrachloride, or any other equivalent material, as will be understood by those skilled in the art.

The several steps described above can be carried out under varying ranges of conditions. Thus, a suitable culture medium is one that contains a considerable proportion of natural material, such as wheat or oat grains or cornmeal. For example, it has been found that the toxin is produced in media having about from 1 to 10 grams of cornmeal per 40 grams of medium. In the removal of the proteins, polysaccharides, and other large molecules, while it is preferred to heat the initial extract, adjust the pH to 9.6, and then add acetone, this can also be accomplished over a pH range of about from 5 to 10, and any other polar solvent, such as ethanol, can be substituted for the acetone. Concentration or reduction in volume of the liquid preparation can be accomplished with or without a vacuum at any temperature up to about 60° C. In the second extraction step, while the specific example given below shows the use of ether at a pH of 5.2, other nonpolar or low-polarity solvents can be used and the pH can vary from about 2.5 to about 9.5. The amount of ether or other nonpolar solvent is not critical; but it is preferred to use a volume at least equal to the volume of the aqueous or other polar solvent phase.

However, if desired, it is possible to omit the nonpolar extraction step altogether and the aqueous acetone or aqueous ethanol concentrate can be chromatographed directly to recover the toxin.

In order that the invention may be better understood, there follows a description in detail of the production and characterization of the toxin. It will readily be apparent to those skilled in the art that the scope of the invention is not restricted to the specific conditions and limitations set forth, but that concentrations, solvents, pH, and the like can be varied, as discussed above, without departing from the spirit of the invention. It will further be apparent that production of the toxin is not limited to the specific strain disclosed but that any other strain of *R. solani* capable of producing the desired product can be substituted.

EXAMPLE

*Growing the culture*

A cornmeal-sand culture medium was prepared, using the following ingredients:

1000 cc. yellow cornmeal
2000 cc. white quartz sand
1700 cc. distilled water

The ingredients were mixed together and placed in ½ inch layers in glass cake pans and autoclaved at 15 p.s.i. for 20 minutes. The cornmeal-sand cake was then diced into cubes, about ½ inch on a side. 500 ml. Erlenmeyer flasks were filled with the cubes, plugged with cotton and sterilized by autoclaving at 15 p.s.i. for 30 minutes. The sterilized flasks of cornmeal-sand medium were then seeded with the mycelium of *R. solani* Kuehn, American Type Culture Collection isolate No. 10157.

The cultures so prepared were then incubated without light at 25° C. for 8 to 28 days.

The contents of a flask of an 8–28 day old cornmeal-sand culture were emptied onto a filter paper in a Büchner funnel and partially broken up by hand. A 200 ml. portion of distilled water was poured on the culture, and the water extract drawn through the funnel into a sidearm flask below with mild suction. This water extract was again drawn through with mild suction. This process was repeated until the culture material had been extracted a total of 4 times with the water from the original 200 ml. of water. This water extract, collected in the sidearm flask was retained and the remainder of the cornmeal-sand culture in the funnel discarded. The water extract was boiled for 10 minutes, cooled to room temperature and adjusted to pH 9.6 with 1 N NaOH. Five volumes of acetone were then added slowly. A precipitate formed which was removed by filtration through a Seitz bacterial filter, and discarded. The acetone soluble fraction was reduced in vacuo at 50° C. to 50 ml., thereby removing all the acetone and leaving only a brown aqueous residue. This aqueous residue was cooled, adjusted to pH 5.2 with 1 N HCl, and passed through a Seitz filter to remove undissolved materials. The insoluble materials were discarded. The aqueous solution was further reduced in vacuo at 55° C. to 15 ml. and cooled to room temperature (Aqueous Fraction I).

The 15 ml. aqueous solution at pH 5.2 was extracted by shaking in a separatory funnel with three 30 ml. portions of diethyl ether. The ether phases were saved and pooled, while the aqueous phase was discarded. The ether was removed by evaporation under a hood at room temperature, leaving about 0.7 ml. of a clear, yellow liquid. This liquid was spotted on 18" x 22" sheets of Whatman No. 1 chromatographic paper, 150 microliters per spot, 8 spots per sheet and the chromatograms developed by descending chromatography for 15–18 hours at room temperature with n-butanol:acetic acid:water (4:1:5 v./v.) epiphase (atmosphere of chromatographic cabinet saturated with hypophase placed in dish). The chromatograms were then dried for at least 30 minutes in moving air (chemical hood) at room temperature.

Results

The phytotoxic substance occurs at $Rf$ 0.62 as determined by the following tests:

(1) Strips were cut from the areas of chromatograms traversed by the spots from origin to front. The strips were divided transversely into pieces 0.05 $Rf$ unit in length, placed in Petri dishes, and moistened with distilled water. Alfalfa (*Medicago sativa* variety Atlantic) seed placed on the moistened strips failed to germinate or germinated very poorly (stunted and brown radicles) on pieces from $Rf$ 0.06 to 0.65, but germinated well on pieces from all other $Rf$'s at 24° C. in light or dark.

(2) Pieces obtained from chromatograms, as above, were placed on the upper primary roots of 4–6 day old garden pea (*Pisum sativum* variety Early Alaska) seedlings germinated and grown under aseptic conditions in Petri dishes, and were moistened with water. Light brown, hydrotic, sunken lesions formed on the pea roots directly beneath pieces from $Rf$ 0.60 to 0.65; but the pea roots under pieces from other $Rf$'s remained healthy.

The spot at $Rf$ 0.62 on paper chromatograms has the following properties:

(1) Looks grey under ultra violet light due to absorption of the UV-light.
(2) Gives color reactions when sprayed with chemical reagents as follows (methods of Bloch, Durrum and Zweig, 1958, Paper Chromatography and Paper Electrophoresis, Academic Press, N.Y.):

(a) Diazotized sulfanilic acid and 20% $Na_2CO_3$ overspray—orange (fresh chromatogram) or yellow (old chromatogram);
(b) Diazotized p-nitroaniline with 20% $Na_2CO_3$ overspray—light yellow;
(c) Sucrose in HCl+ethanol—heated 1 minute—light grey;
(d) Ammoniacal $AgNO_3$—heat—brown;
(e) 1 N NaOH—dried—yellow;
(f) p-Dimethylaminobenzaldehyde — heat — brown (fresh chromatogram) or pink (old chromatogram);
(g) 1% nitrobenzenediazonium fluroborate in acetone with 0.1 N KOH overspray—reddish yellow;
(h) 2,6 - dichloroquinonechlorimide with saturated $NaHCO_3$ overspray—grey to black;
(i) p-Anisidine—heat—grey to grey purple (fresh chromatogram) or light brown (older chromatogram);
(j) Benzidine—heat—bright yellow;
(k) Aniline hydrogen phthalate—heat—yellow or brown;
(l) Cinnamaldehyde—green;
(m) N-(1 - naphthyl) ethylenediamine—heat—dark grey;
(n) $FeCl_3$—$HClO_4$—light grey after awhile.

(3) There were no color reactions with the following reagents:

(a) Ethanolic methyl red at pH 7.0;
(b) 0.2% ninhydrin in butanol—heat;
(c) Ethanolic $AlCl_3$;
(d) Dragendorff reagents;
(e) Crotonaldehyde;
(f) 3% $FeCl_3$ in n-butanol.

These results suggest that the phytotoxin is a phenolic glycoside.

Evidence concerning the structure of the molecule

A. The phenolic part of the molecule appears to be o-nitrophenol (I),

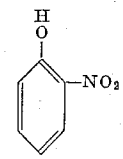

(I)

or to be easily converted to o-nitrophenol.

Chromatograms sprayed with 1 N NaOH form a bright yellow spot at $Rf$ 0.62 upon reaching total dryness. Such spots were eluted with water and the spectral properties were compared with solutions of authentic o-nitrophenol, m-nitrophenol, and p-nitrophenol with a B and L Spectronic 20 colorimeter.

The presence of an absorption maximum near 415 m$\mu$ (Table I, below) as well as the bright yellow color above pH 7.0 and loss of color below pH 7.0 indicates that the eluate from the NaOH treated spot contained o-nitrophenol.

TABLE I

| Wave Length, m$\mu$ | Percent transmittance | | | |
|---|---|---|---|---|
| | Toxin phenol | o-Nitrophenol | m-Nitrophenol | p-Nitrophenol |
| 390 | 30 | 62 | 24 | 37 |
| 400 | 27 | 59 | 25 | 37 |
| 410 | 25 | 57 | 28 | 40 |
| 415 | 25 | 57 | | |
| 420 | 27 | 57.5 | 33 | 50 |

In another experiment o-nitrophenol was isolated from partially purified extracts as follows:

Aqueous Fraction I (above) was adjusted to pH 2.5 with 1 N HCl and flash evaporated in vacuo at 55° C. A yellowish condensate was collected in the receiving flask, and this was steam distilled. The first few ml. of steam distillate apparently contained o-nitrophenol as indicated by the spectral absorption maximum in 0.05 N NaOH at 415 m$\mu$ obtained with a Beckman DU spectrophotometer (Table II).

TABLE II

| Wave Length, m$\mu$ | Percent transmittance | |
|---|---|---|
| | Authentic o-nitrophenol in 0.05 N NaOH | Steam distillate from aqueous extract in 0.05 N NaOH |
| 390 | 87 | 80 |
| 400 | 86 | 80 |
| 410 | 85.5 | 81 |
| 415 | 84.5 | 75 |
| 420 | 86 | 78 |
| 430 | 88 | 81 |

B. The glycosidic part of the molecule appears to be glucose, or is in part converted to glucose during acid hydrolysis, as indicated by the following experiment:

Twelve spots with chromatogrammed toxin at $Rf$ 0.62 were cut out from chromatograms and eluted with water. The eluate was passed through a Seitz filter to eliminate cellulose particles, then adjusted to pH 2.0 with 1 N HCl and boiled with refluxing for 1 hour. The acid hydrolyzed preparation was reduced in vacuo at 55° C. to 1 ml.

and spotted on Whatman No. 1 paper, 100 microliters per spot, and partitioned by descending chromatography 15 hrs. with butanol:acetic acid:water (4:1:5 v./v.). A spot occurred at $R_f$ 0.18 which, on the basis of its color reactions with p-anisidine and aniline hydrogen phthalate and $R_f$ value, was tentatively identified as glucose. These data indicate that the toxin may have a configuration closely related to o-nitrophenyl-β-D-glucoside (II):

$$\text{(II)}$$

*Herbicidal activity of the compound*

The herbicidal effect on alfalfa seed germination and on pea roots has already been shown above.

Further herbicidal properties were demonstrated as follows:

Cheesecloth pads were dipped in Aqueous Fraction 1 (above) and placed on hypocotyls of 14 day old cotton seedlings. Within 3 days necrotic lesions developed beneath the pads and spread upwards. The cortex was completely killed.

Because of the indicated wide spectrum of phytotoxicity, the substance could be used to remove vegetation from a plot of ground. On the basis of its structure, as elucidated above, the compound would be expected, not only to be readily decomposed by microorganisms (thus avoiding the problem of toxic residues), but also to have a low order of mammalian toxicity.

Having described the invention, what I now claim is:

1. A method for producing a phytotoxin comprising:
    (a) extracting a culture of *R. solani* with a member of the group consisting of water and a polar solvent;
    (b) precipitating contaminating large molecules from the extract;
    (c) concentrating the extract; and
    (d) chromatographing the concentrated extract to recover the phytotoxin.

2. A method for producing a phytotoxin comprising:
    (a) extracting a culture of *R. solani* with a member of the group consisting of water and a polar solvent;
    (b) precipitating contaminating large molecules from the extract;
    (c) concentrating the extract;
    (d) extracting the concentrate from step (c) with a nonpolar solvent;
    (e) concentrating the so-produced nonpolar extract; and
    (f) chromatographing the product of step (e) to recover the phytotoxin.

3. A method for producing a phytotoxin comprising:
    (a) extracting a culture of *R. solani* with a member of the group consisting of water and a polar solvent to produce a first extract;
    (b) heating said first extract;
    (c) adjusting the pH to within a range of about from 5 to 10;
    (d) adding a polar solvent;
    (e) concentrating said first extract to produce a first concentrate;
    (f) extracting said first concentrate with a nonpolar solvent to produce a second extract;
    (g) concentrating said second extract to produce a second concentrate; and
    (h) chromatographing said second concentrate to recover the phytotoxin.

4. A method of producing a phytotoxin comprising:
    (a) extracting a culture of *R. solani* with a member of the group consisting of water and a polar solvent to produce a first extract;
    (b) heating said first extract;
    (c) adjusting the pH to within a range of about from 5 to 10;
    (d) adding a polar solvent;
    (e) concentrating said first extract at a temperature up to about 60° C. to produce a first concentrate;
    (f) adjusting the pH of said first concentrate to within a range of about from 2.5 to 9.5;
    (g) extracting with a nonpolar solvent to produce a second extract;
    (h) concentrating said second extract to produce a second concentrate; and
    (i) chromatographing said second concentrate to recover the phytotoxin.

5. A method for producing a phytotoxin comprising:
    (a) extracting a culture of *R. solani* with water to produce an aqueous extract;
    (b) heating said aqueous extract;
    (c) adjusting said aqueous extract to a pH of about 9.6;
    (d) adding acetone to precipitate contaminating large molecules;
    (e) heating the aqueous acetone residue to remove acetone;
    (f) adjusting the residue from step (e) to a pH of about 5.2;
    (g) concentrating said residue to produce a first concentrate;
    (h) extracting said first concentrate with diethyl ether to produce a second extract;
    (i) removing the ether from said second extract to produce a second concentrate; and
    (j) chromatographing said second concentrate to recover the phytotoxin.

6. The process of claim 5 wherein the volume of ether is at least equal to the volume of the first concentrate.

References Cited by the Examiner

UNITED STATES PATENTS 2,331,619  10/43  Morse _____ 260—210
2,524,414  10/50  Wolfrom et al. _____ 260—210

FOREIGN PATENTS 768,919  2/57  Great Britain.

LEWIS GOTTS, *Primary Examiner.*